(12) United States Patent
Sasakawa et al.

(10) Patent No.: US 8,126,209 B2
(45) Date of Patent: Feb. 28, 2012

(54) ROAD IMAGE ANALYZING APPARATUS AND ROAD IMAGE ANALYZING METHOD

(75) Inventors: Tadashi Sasakawa, Kawasaki (JP); Lin Zhu, Chiba (JP)

(73) Assignee: Pasco Corporation, Tokyo (JP)

( * ) Notice: Subject to any disclaimer, the term of this patent is extended or adjusted under 35 U.S.C. 154(b) by 785 days.

(21) Appl. No.: 12/225,583

(22) PCT Filed: Mar. 23, 2007

(86) PCT No.: PCT/JP2007/055986
§ 371 (c)(1),
(2), (4) Date: Sep. 25, 2008

(87) PCT Pub. No.: WO2007/111241
PCT Pub. Date: Oct. 4, 2007

(65) Prior Publication Data
US 2009/0274362 A1 Nov. 5, 2009

(30) Foreign Application Priority Data
Mar. 28, 2006 (JP) .................................. 2006-089496

(51) Int. Cl.
*G06K 9/62* (2006.01)
(52) U.S. Cl. ........................................ 382/104; 382/154
(58) Field of Classification Search .................. None
See application file for complete search history.

(56) References Cited

U.S. PATENT DOCUMENTS

| | | | | |
|---|---|---|---|---|
| 6,122,597 | A * | 9/2000 | Saneyoshi et al. | 701/301 |
| 6,763,125 | B2 * | 7/2004 | Ohta | 382/104 |
| 6,813,370 | B1 * | 11/2004 | Arai | 382/104 |
| 6,888,953 | B2 * | 5/2005 | Hanawa | 382/104 |
| 2005/0117781 | A1 * | 6/2005 | Aoyama | 382/103 |
| 2005/0196034 | A1 * | 9/2005 | Hattori et al. | 382/154 |

FOREIGN PATENT DOCUMENTS

| | | |
|---|---|---|
| JP | A-1-242916 | 9/1989 |
| JP | A-4-253286 | 9/1992 |
| JP | A-6-266828 | 9/1994 |
| JP | A-7-78234 | 3/1995 |
| JP | A-2003-281552 | 10/2003 |

OTHER PUBLICATIONS

First Office Action for corresponding Chinese Patent Application No. 200780011198.1, mailed on Mar. 10, 2011 (w/ English translation).

* cited by examiner

*Primary Examiner* — Brian Werner
(74) *Attorney, Agent, or Firm* — Oliff & Berridge, PLC (57) ABSTRACT

In a road image analyzing apparatus capable of obviously and rapidly distinguishing a road marking from a guardrail and capable of obtaining precise position information, a pre-processing unit defines sub-areas to main image data obtained by an image pickup unit, and an edge extracting unit extracts an edge component in each of the sub-areas. A linear line extracting unit analyzes the extracted edge component to extract a linear component, and a linear component analyzing unit extracts a continuous component from the linear component by using the linear component. A matching process unit performs a matching process between a vertex of the continuous component and auxiliary image data to obtain three-dimensional position information of each continuous component. An identifying unit identifies whether the continuous component is a road marking or a guardrail on the basis of height information of each continuous component included in the three-dimensional position information.

8 Claims, 8 Drawing Sheets

| ATTRIBUTE | X-COORDINATE | Y-COORDINATE | Z-COORDINATE |
|---|---|---|---|
| GUARDRAIL G1 | G1x | G1y | G1z |
| GUARDRAIL G2 | G2x | G2y | G2z |
| ... | ... | ... | ... |
| ROAD MARKING L1 LEFT SIDE | L1lx | L1ly | L1lz |
| ROAD MARKING L1 RIGHT SIDE | L1rx | L1ry | L1rz |
| ROAD MARKING L2 LEFT SIDE | L2lx | L2ly | L2lz |
| ROAD MARKING L2 RIGHT SIDE | L2rx | L2ry | L2rz |
| ... | ... | ... | ... |

FIG.10

ROAD IMAGE ANALYZING APPARATUS AND ROAD IMAGE ANALYZING METHOD

TECHNICAL FIELD

The present invention relates to a road image analyzing apparatus and a road image analyzing method for analyzing a road image to extract a road marking such as a road center line, a road boundary line, or a road edge line, and a guardrail, or the like.

BACKGROUND ART

In a conventional art, in order to create a high-precision road map, precise position information related to a road marking, a guardrail, and the like is necessary. For this purpose, a method of performing analysis in which a two-dimensional image obtained by an in-vehicle monocular camera is used, and analysis is performed based on a luminance of the two-dimensional image, is known, for example. An example of such a technique is disclosed in Japanese Patent Application Laid-Open No. 1-242916.

Japanese Patent Application Laid-Open No. 6-266828 discloses a technique in which three-dimensional position data is calculated from a stereo image obtained by a stereo camera to detect a sidewall such as a guardrail.

DISCLOSURE OF THE INVENTION

Problem to be Solved by the Invention

However, the sign conventional art has a problem that when a two-dimensional image obtained by a monocular camera is used, both a road marking and a guardrail are linear images. For this reason, the images cannot be easily distinguished from each other.

When a stereo image obtained by a stereo camera is used, a processing load is heavy because a matching process must be performed on the entire image. Even when the image is divided into small regions to speed up the matching process, a plurality of objects at different distances are mixed in the small regions. For this reason, sufficient distance measuring precision cannot be attained. Furthermore, a road marking and a guardrail cannot be easily distinguished from each other by using only the obtained three-dimensional position information.

The present invention has been made in consideration of the above conventional problem, and the object thereof is to provide a road image analyzing apparatus and a road image analyzing method capable of obviously and rapidly distinguishing a road marking from a guard rail and capable of obtaining precise position information.

Means for Solving the Problem

In order to achieve the above object, the present invention provides a road image analyzing apparatus including: two image pickup units that photograph the same position from different directions; a continuous component extracting unit that extracts a continuous component from image data obtained by one of the image pickup units; a three-dimensional position calculating unit that combines the continuous component with image data obtained by the other image pickup unit to calculate three-dimensional position information of the continuous component; and an identifying unit that identifies the continuous component on the basis of the three-dimensional position information calculated by the three-dimensional position calculating unit.

The continuous component extracting unit may extract a linear component from the image data obtained by one of the image pickup units and extract the continuous component on the basis of a position and an inclination of the linear component and association between linear lines.

The three-dimensional position calculating unit may perform a matching process between an end point of the continuous component and the image data obtained by the other image pickup unit to calculate three-dimensional position information.

The identifying unit may identify the continuous component on the basis of height information of the continuous component included in the three-dimensional position information.

The continuous component extracting unit, the three-dimensional position calculating unit, and the identifying unit may use a sub-area, which is defined in a direction orthogonal to a running direction of a road, as a process unit.

The present invention provides a road image analyzing method including: a step of photographing the same position from two different directions; a step of extracting a continuous component from image data photographed from one of the two different directions; a step of combining the continuous component with image data photographed from the other direction and calculating three-dimensional position information of the continuous component; and a step of identifying the continuous component on the basis of the calculated three-dimensional position information.

In the step of extracting a continuous component, a linear component is extracted from the image data photographed from one of the two different directions; and the continuous component is extracted on the basis of a position and an inclination of the linear component and association between linear lines.

In the step of calculating three-dimensional position information of the continuous component, a matching process is performed between an end point of the continuous component and the image data photographed from the other direction to calculate three-dimensional position information.

In the step of identifying a continuous component, the continuous component is identified on the basis of height information of the continuous component included in the three-dimensional position information.

The step of extracting a continuous component, the step of calculating three-dimensional position information of a continuous component, and the step of identifying a continuous component are performed by using a sub-area, which is defined in a direction orthogonal to a running direction of a road, as a process unit.

BEST MODE FOR CARRYING OUT THE INVENTION

A best mode for carrying out the present invention (referred to as an embodiment below) will be described below with reference to the accompanying drawings.

Figure 1:
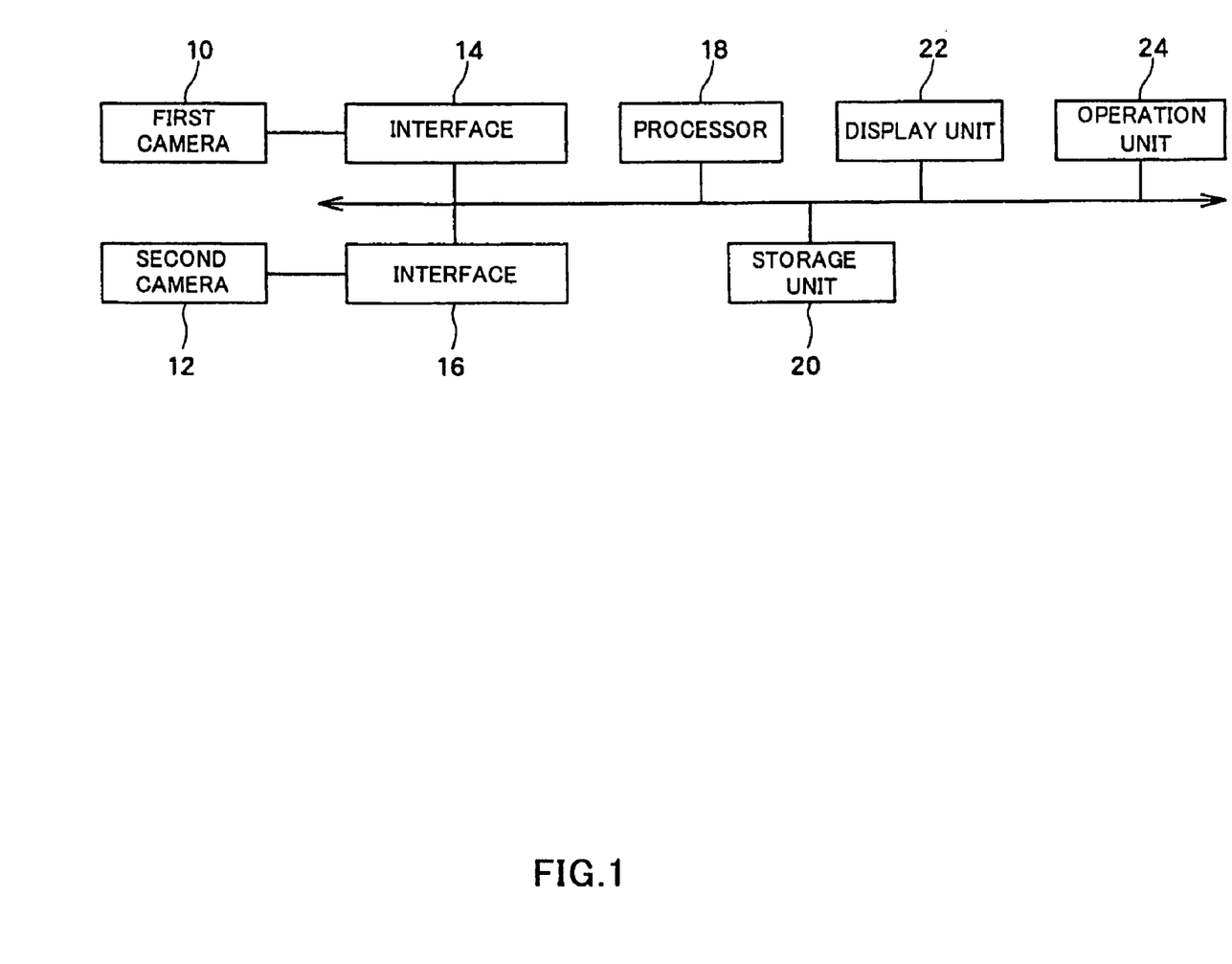
FIG. 1 is a block diagram of a configuration example of a road image analyzing apparatus according to the present invention.

FIG. 1 shows a block diagram of a configuration example of a road image analyzing apparatus according to the present invention. This road image analyzing apparatus can be realized by a personal computer or the like. In FIG. 1, the road image analyzing apparatus includes a first camera 10, a second camera 12, interfaces 14 and 16, a processor 18, a storage unit 20, a display unit 22, and an operation unit 24.

The first camera 10 is one of two stereo cameras provided as a pair to take a stereo image, for example, a left camera. The second camera 12 is the other of the stereo cameras, for example, a right camera. The first camera 10 and the second camera 12 photograph the same position from different directions to obtain color images or monochrome images, and form an image pickup unit of the present invention.

The interfaces 14 and 16 receive the image data obtained by the first camera 10 and the second camera 12 and transfer the image data to the processor 18 or the like.

The processor 18 includes a CPU (Central Processing Unit) or the like, and controls the operations of the interfaces 14 and 16, the storage unit 20, the display unit 22, and the operation unit 24 while exchanging data therewith.

The storage unit 20 is a computer readable storage medium including a working RAM (Random Access Memory) of the processor 18, a ROM (Read-only memory) in which a program performed by the processor 18 or the like is stored, a flash memory serving as a nonvolatile memory, a magnetic storage medium, and the like. The storage unit 20 may store position information of a road sign or a guardrail as an analyzing result obtained by the apparatus.

The display unit 22 includes a liquid crystal display (LCD) or the like and displays, for example, an analyzing result of the road image analyzing apparatus, a user interface for a user to input an operation instruction to the road image analyzing apparatus, or the like.

The operation unit 24 includes a pointing device such as a mouse and an input device such as a keyboard, to be used by a user to input data.

Figure 2:
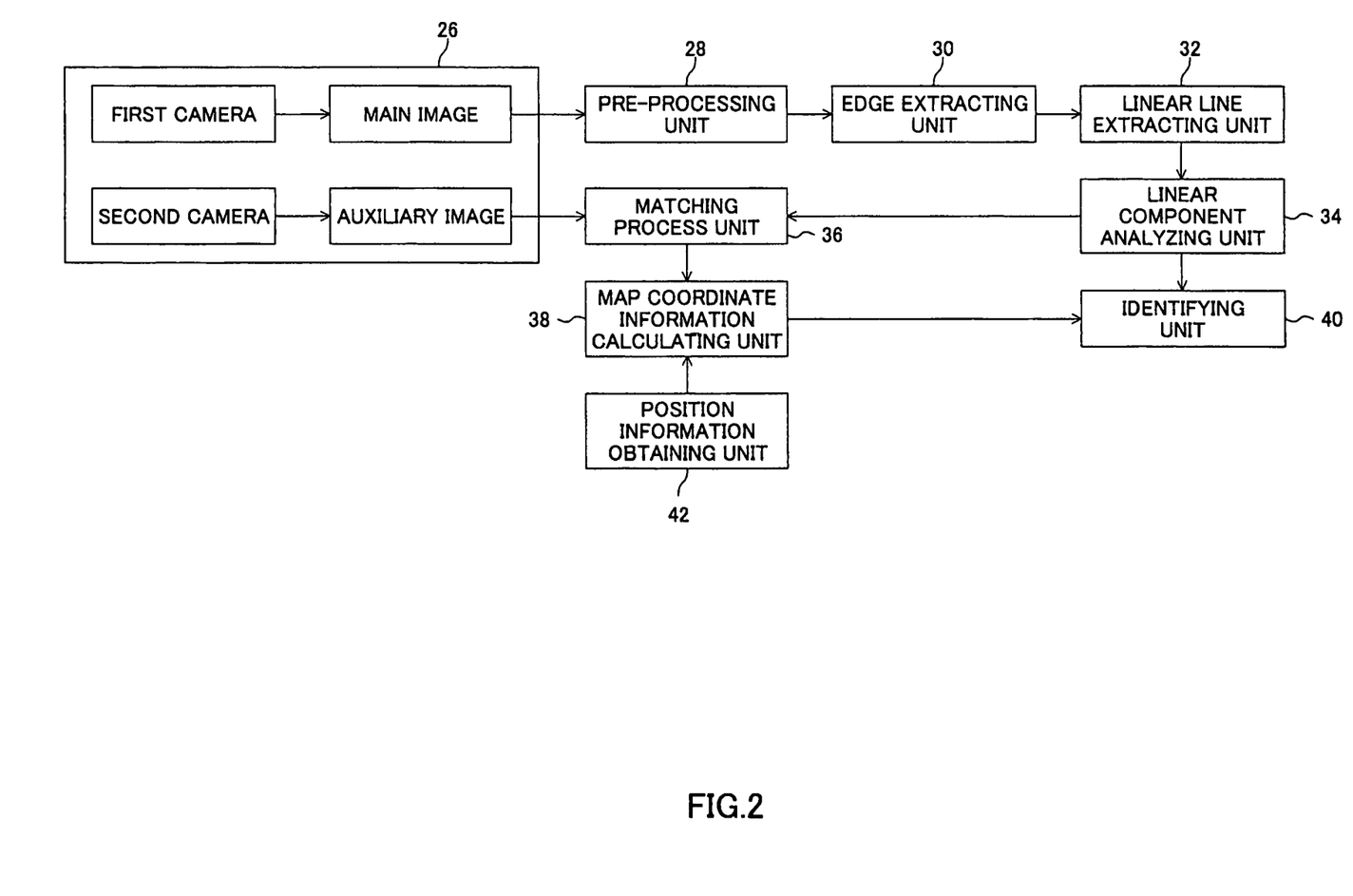
FIG. 2 is a functional block diagram representing functions of the road image analyzing apparatus according to the present invention.

FIG. 2 shows a functional block diagram representing functions of the road image analyzing apparatus. In FIG. 2, the road image analyzing apparatus includes an image pickup unit 26, a pre-processing unit 28, an edge extracting unit 30, a linear line extracting unit 32, a linear component analyzing unit 34, a matching process unit 36, a map coordinate information calculating unit 38, an identifying unit 40, and a position information obtaining unit 42.

The image pickup unit 26 is realized by the first camera 10, the second camera 12, and the interfaces 14 and 16. The image pickup unit 26 outputs image data obtained by the first camera 10 as main image data and outputs image data obtained by the second camera 12 as auxiliary image data.

The pre-processing unit 28 is realized by the processor 18, performs an image emphasizing process or the like on the main image data to make an edge extracting process easier, and performs a process of dividing an image into a plurality of sub-areas to be basic units for image analysis. The sub-areas are defined to be orthogonal to a running direction of a road.

The edge extracting unit 30 is realized by the processor 18, and extracts edge components in a bright-dark pattern and a dark-bright pattern with respect to luminance or color in each of the sub-areas. Here, the edge component is a contour of a road marking, a guardrail, a columnar structure such as an electric pole, or the like. In the edge extraction, for example, a primary horizontal differential filter may be used.

The linear line extracting unit 32 is realized by the processor 18, and extracts a linear component from the edge component extracted by the edge extracting unit 30. The extraction of the linear component is performed by, for example, Hough Transformation or the like.

The linear component analyzing unit 34 is realized by the processor 18, and extracts a continuous component in the main image data on the basis of a position and an inclination of the linear component extracted by the linear line extracting unit 32, association between such linear components, and the like. Here, the continuous component is a linear component that is repetitively present in a predetermined direction or continues in a predetermined direction in an image. For example, a road boundary line repetitively drawn on a road with a predetermined length, electric poles installed at predetermined intervals on a road edge, and the like are examples of the former, and a road edge line drawn as a continuous line on a road, a guardrail, and the like are examples of the latter. The continuity of the linear component is determined by the linear component analyzing unit 34 based on a positional relationship of the linear components intra-sub-area and inter-sub-area. A linear component of the columnar structure such as an electric pole can be removed and excluded from an object of linear analysis based on the inclination thereof. Furthermore, the association between the linear components is, for example, a distance between the linear components, and is used to extract a road sign drawn on a road. More specifically, since a breadth of a road marking and a length between road markings are known in advance, it can be determined that a combination of linear components having a distance which is obviously larger or smaller than the breadth or the length is not a linear component of the road sign.

The edge extracting unit 30, the linear line extracting unit 32, and the linear component analyzing unit 34 compose a continuous component extracting unit according to the present invention.

The matching process unit 36 is realized by the processor 18, and performs a matching process between a vertex of a continuous component of the main image data and auxiliary image data to calculate relative three-dimensional position information of each of the continuous components by triangulation on the basis of information such as a parallax with a corresponding point and a camera position.

The map coordinate information calculating unit 38 is realized by the processor 18 and calculates coordinate information on a map on the basis of the coordinate information obtained by the position information obtaining unit 42 and the relative three-dimensional position information calculated by the matching process unit 36.

The matching process unit 36 forms a three-dimensional position calculating unit according to the present invention.

The identifying unit 40 is realized by the processor 18, and identifies whether a continuous component is a road marking or a guardrail on the basis of height information of each continuous component included in the three-dimensional position information.

The position information obtaining unit 42 is realized by a GPS (Global Positioning System), a gyro, or the like, and calculates a position and an attitude of the image pickup unit 26 at the time of image pickup, determines coordinates of corresponding image data, and outputs the coordinates to the map coordinate information calculating unit 38 as coordinate information.

Figure 3:
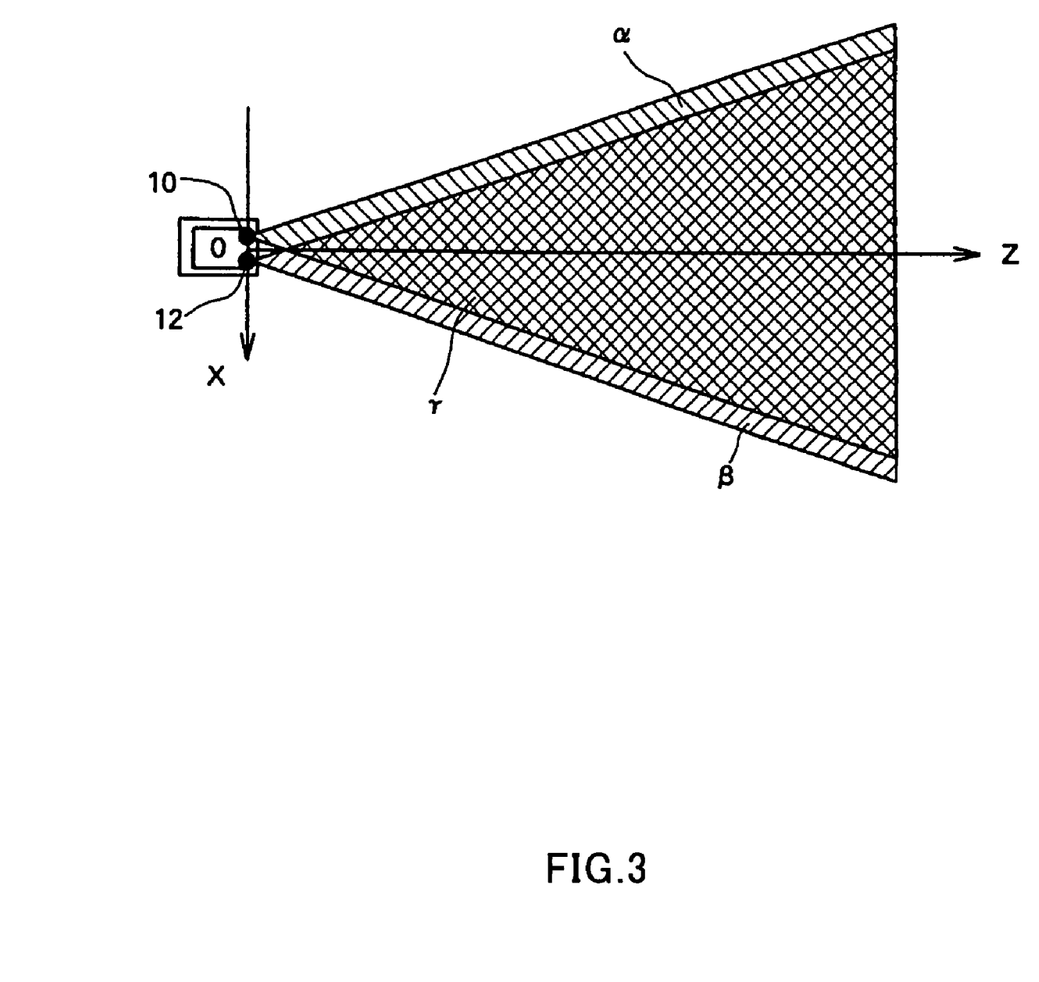
FIG. 3 is an explanatory diagram of a photographing area of an image pickup unit.

FIG. 3 shows an explanatory diagram of a photographing area of the in-vehicle image pickup unit 26. In FIG. 3, an arranging direction of the first camera 10 and the second camera 12 in the image pickup unit 26 is represented by X, and a photographing direction (running direction of the vehicle) is represented by Z. A photographing area of the left camera serving as the first camera 10 is represented by α, and a photographing area by the right camera serving as the second camera is represented by β. The cameras may also be arranged facing a direction opposing the running direction of the vehicle.

In FIG. 3, image data in the photographing area α is main image data, and image data in the photographing area β is auxiliary image data. The matching process by the matching process unit 36 is performed on image data of an object existing in an overlapped area γ where the photographing area α and the photographing area β overlap.

Figure 4:
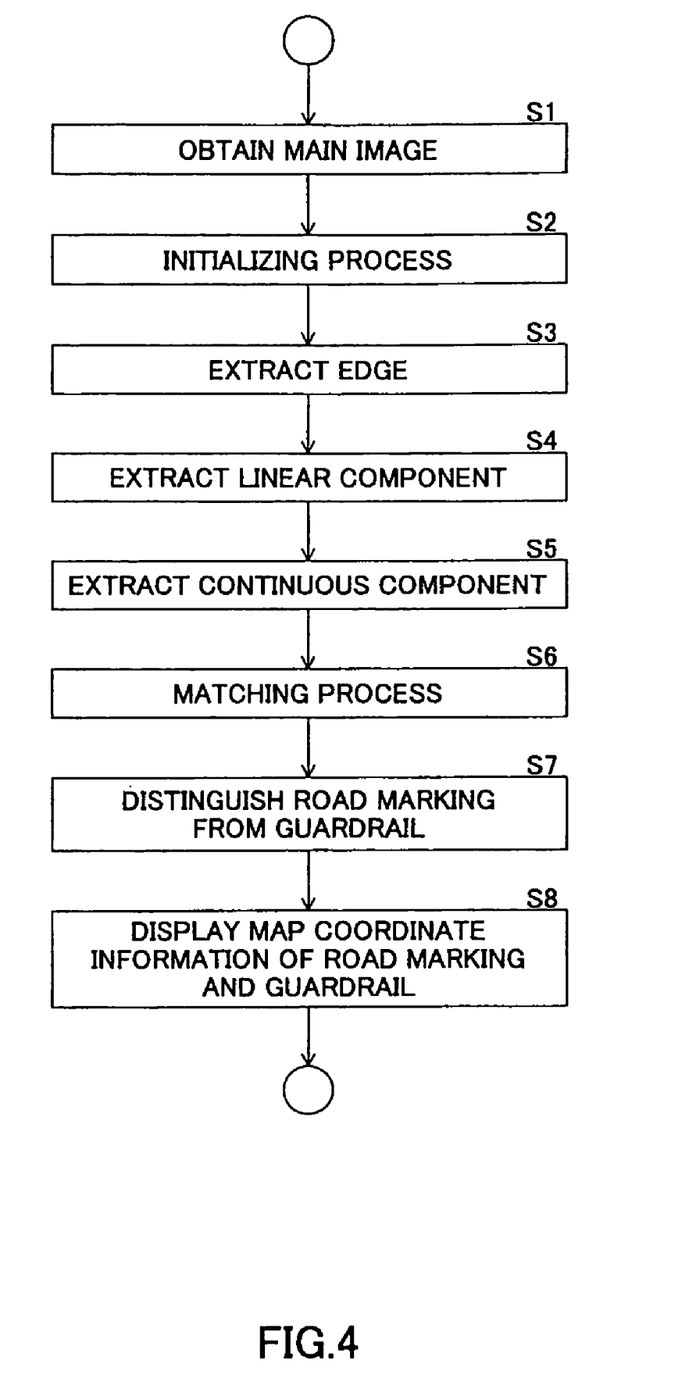
FIG. 4 is a flow chart of an operation example of the road image analyzing apparatus according to the present invention.

FIG. 4 shows a flow of an operation example of the road image analyzing apparatus according to the embodiment described referring to FIGS. 1 and 2. In FIG. 4, the pre-processing unit 28 obtains main image data from the image pickup unit 26 (S1). Here, in FIG. 2, image data picked up by the first camera 10 is defined as the main image data. However, image data picked up by the second camera 12 may be defined as the main image data.

The pre-processing unit 28 performs the initializing process on the obtained main image data and defines a plurality of sub-areas (S2).

Figure 5:
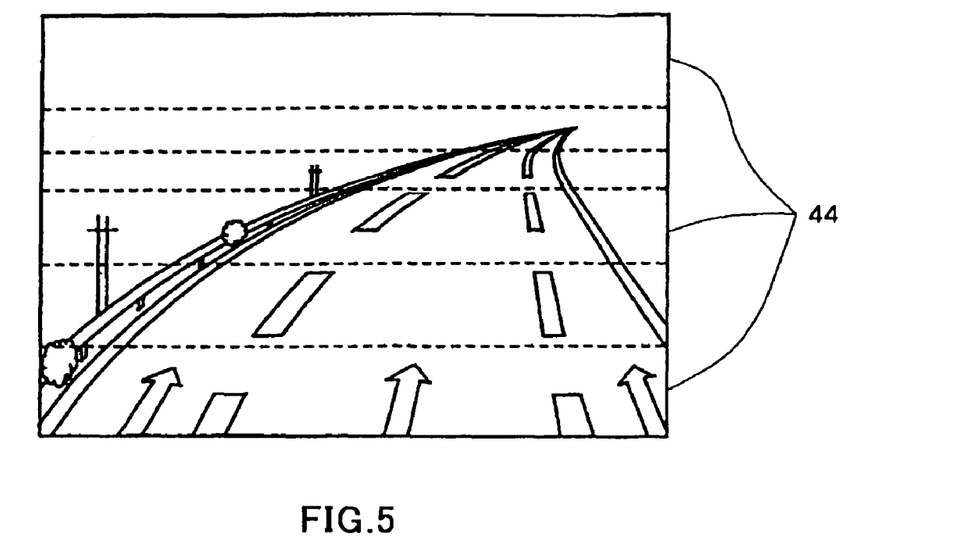
FIG. 5 shows an example of a main image in which a sub-area is defined.

FIG. 5 shows a main image in which sub-areas are defined. In FIG. 5, a plurality of sub-areas 44 are defined in the main image and partitioned by broken lines.

The edge extracting unit 30 extracts an edge component for each of the sub-areas 44 (S3). This edge extracting process is performed by recognizing a bright-dark pattern and a dark-bright pattern of luminance or color by using a primary horizontal differential filter in each of the sub-areas of the main image data subjected to the initializing process. Since a road marking, a guardrail, a columnar structure such as an electric pole in the main image shown in FIG. 5 have luminances higher than that of a background such as a road, a boundary between a bright part and a dark part is recognized as an edge.

Figure 6:
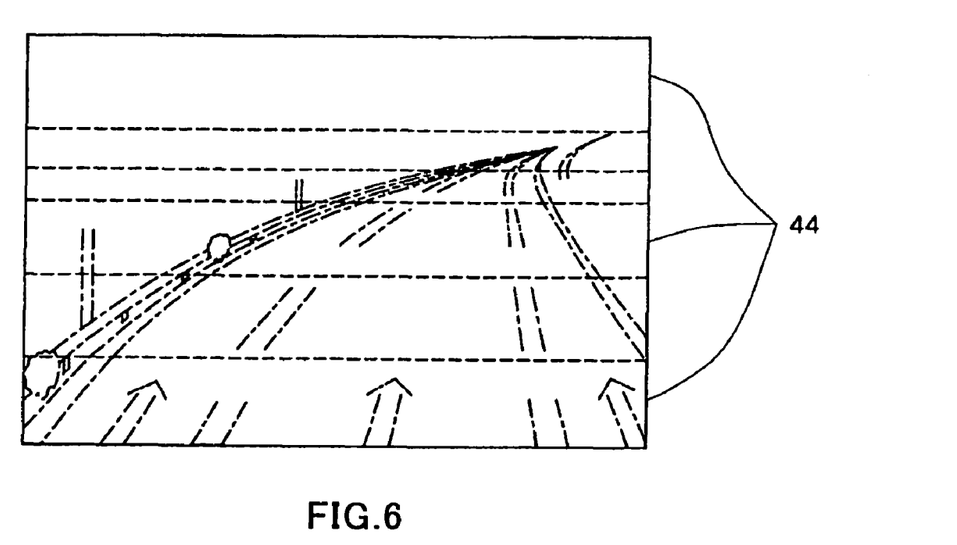
FIG. 6 shows an explanatory diagram of an edge extracting process.

FIG. 6 shows an explanatory diagram of the edge extracting process. In FIG. 6, each edge component extracted by the edge extracting unit 30 is shown by chain lines.

The linear line extracting unit 32 analyzes the extracted edge component to extract a linear component (S4).

Figure 7:
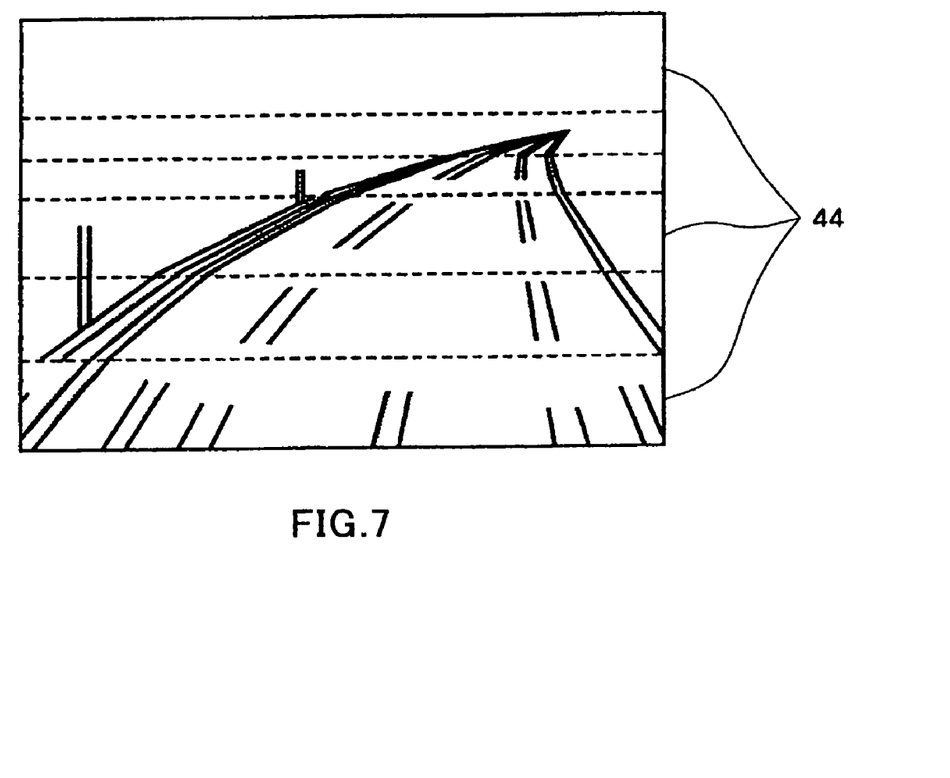
FIG. 7 shows an example of extracted linear components.

In FIG. 7, an example of the extracted linear component is indicated by a solid line. At this stage, the extracted linear component is not distinguished as being a road marking, a guardrail, or the columnar structure such as an electric pole.

For this reason, the linear component analyzing unit 34 extracts a continuous component to be an object to be analyzed on the basis of a position and an inclination of the linear component, association between linear lines, and the like (S5). When this continuous component is extracted, a columnar structure such as an electric pole is preferably excluded on the basis of an inclination or a position on a road of a linear component. In this manner, the subsequent processes can be performed only on the road sign and the guardrail, and thus the processes can be simplified.

Figure 8:
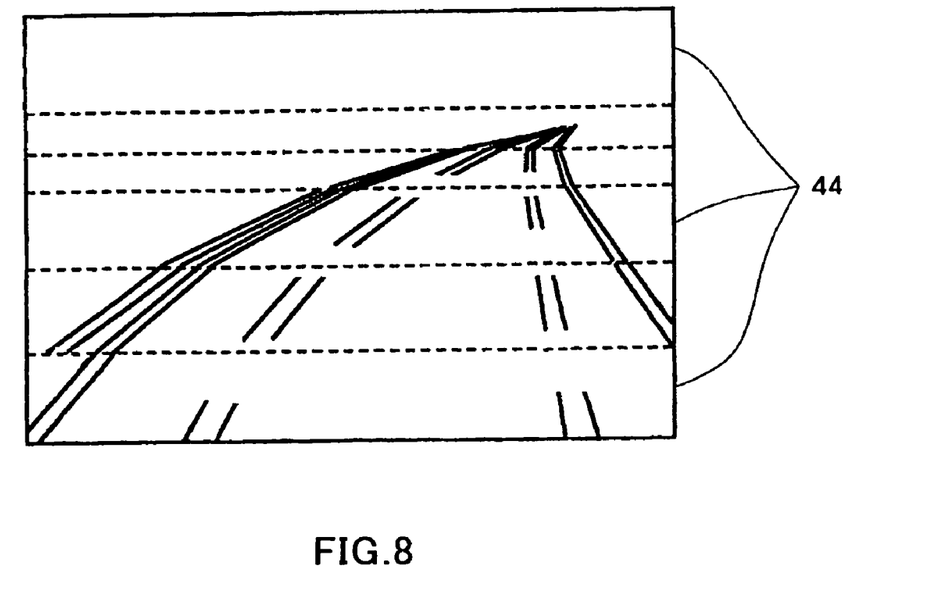
FIG. 8 shows an example of a result of a continuous component extracting process.

FIG. 8 shows an example of a result of a continuous component extracting process. In FIG. 8, linear components which are repetitively present in a predetermined direction or which are continuous in the predetermined direction in an image are extracted.

The matching process unit 36 performs a matching process of a vertex of the continuous component and auxiliary image data (S6).

Figure 9:
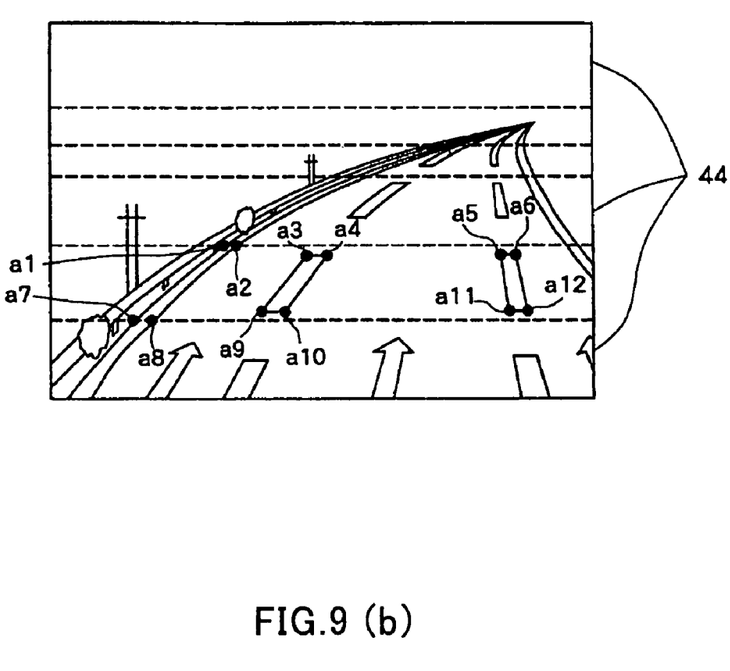
FIG. 9 shows an explanatory diagram of a matching process.

FIGS. 9(a) and 9(b) show explanatory diagrams of the matching process. Here, FIG. 9(a) shows a continuous component extracted by the linear component analyzing unit 34, and FIG. 9(b) shows a matching result with the auxiliary image. The matching process unit 36 performs matching between an end point of the continuous component shown in FIG. 9(a) and auxiliary image data by, for example, an area correlation method, and calculates relative three-dimensional position information of each continuous component by triangulation on the basis of information such as a parallax to a corresponding point, a camera position, and a camera attitude. In FIG. 9(a), twelve points (a1 to a12) of the end point examples are shown. The number of end points is not limited to the twelve points and may be more. With the above process, corresponding point search is performed not on all the points but on the end points of only the continuous components, whereby a matching process can be rapidly performed at high precision.

The map coordinate information calculating unit 38 calculates coordinate information on a map on the basis of the coordinate information obtained by the position information obtaining unit 42 and the relative three-dimensional position information calculated by the matching process unit 36. The identifying unit 40 identifies whether a continuous component is a road marking or a guardrail on the basis of height information of each continuous component included in the coordinate information on the map (S7). This process may be performed by setting a certain threshold on the height information, and identifying a continuous component having a height larger than the threshold as a guardrail, and a continuous component having a height smaller than the threshold as a road sign. The identifying process may be performed on the basis of relative coordinate information, and thereafter coordinate information on the map can be calculated from the coordinate information obtained by the position information obtaining unit 42.

Figure 10:
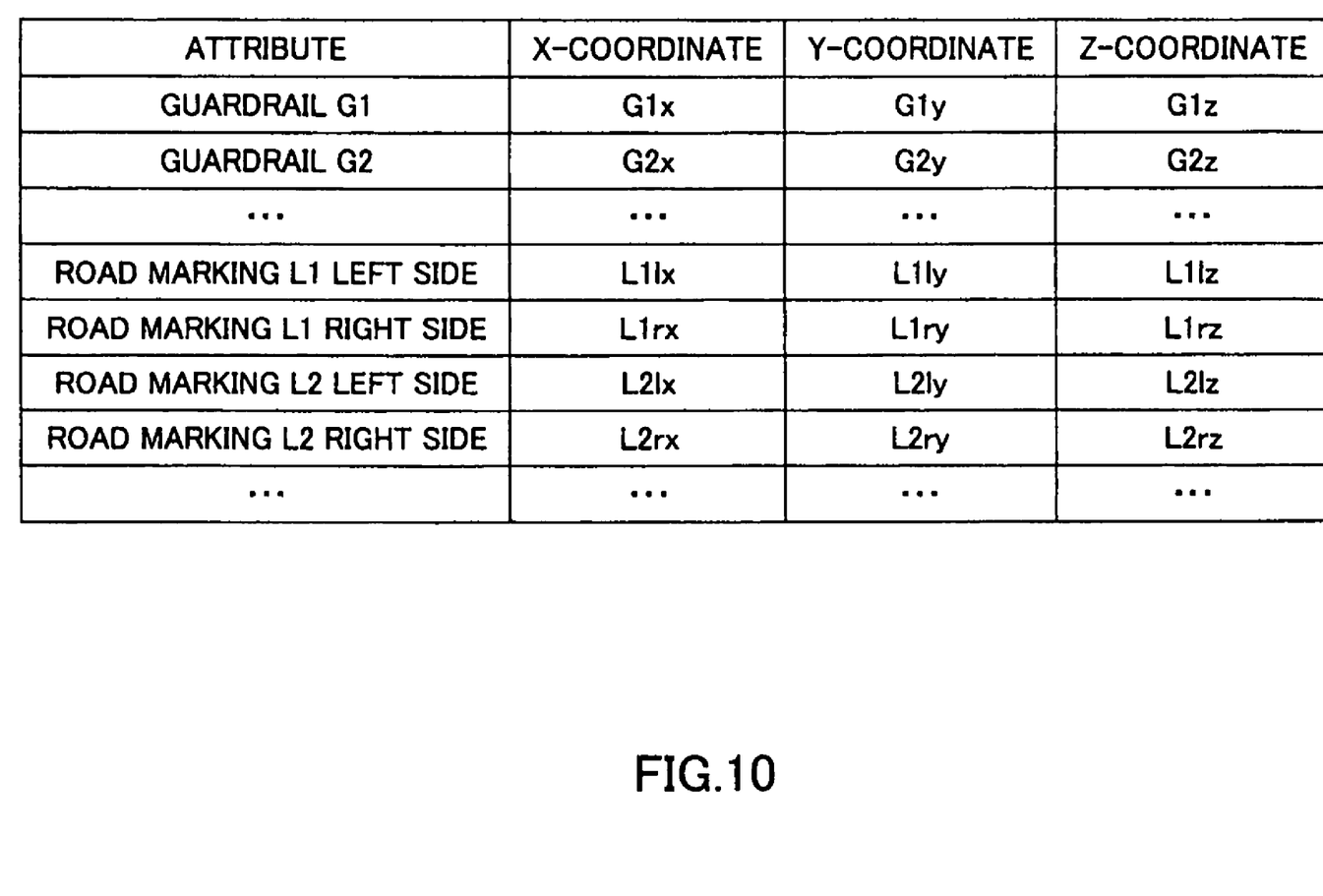
FIG. 10 shows a display example of an analyzing result of a road image.

The coordinate information on the map of the road sign and the guardrail calculated by the analyzing operation is displayed on the display unit 22 (S8). FIG. 10 shows an example of the display. In FIG. 10, coordinates X, Y, and Z are shown for each of the attributes of the road sign and the guardrails. The coordinate information may be stored in the storage unit 20 as a database.

According to the steps described above, the linear component analyzing unit 34 narrows down an object to be analyzed to a road marking and a guardrail, and the matching process unit 36 and the identifying unit 40 distinguish the road marking from the guardrail. In this manner, the road marking and the guardrail can be obviously distinguished from each other by a combination of simple processes and precise position information can also be obtained.

INDUSTRIAL APPLICABILITY

According to the present invention, a road marking and a guardrail can be obviously and rapidly distinguished from each other, and precise position information can be obtained.

FIG. 1

| | |
|---|---|
| 10: | FIRST CAMERA |
| 12: | SECOND CAMERA |
| 14: | INTERFACE |
| 16: | INTERFACE |
| 18: | PROCESSOR |
| 20: | STORAGE UNIT |
| 22: | DISPLAY UNIT |
| 24: | OPERATION UNIT |

FIG. 2

| | |
|---|---|
| 26: | FIRST CAMERA |
| | SECOND CAMERA |
| | MAIN IMAGE |
| | AUXILIARY IMAGE |
| 28: | PRE-PROCESSING UNIT |
| 30: | EDGE EXTRACTING UNIT |
| 32: | LINEAR LINE EXTRACTING UNIT |
| 34: | LINEAR COMPONENT ANALYZING UNIT |
| 36: | MATCHING PROCESS UNIT |
| 38: | MAP COORDINATE INFORMATION CALCULATING UNIT |
| 40: | IDENTIFYING UNIT |
| 42: | POSITION INFORMATION OBTAINING UNIT |

FIG. 4

| | |
|---|---|
| S1: | OBTAIN MAIN IMAGE |
| S2: | INITIALIZING PROCESS |
| S3: | EXTRACT EDGE |
| S4: | EXTRACT LINEAR COMPONENT |
| S5: | EXTRACT CONTINUOUS COMPONENT |
| S6: | MATCHING PROCESS |
| S7: | DISTINGUISH ROAD SIGN FROM GUARDRAIL |
| S8: | DISPLAY MAP COORDINATE INFORMATION OF ROAD SIGN AND GUARDRAIL |

FIG. 10

ATTRIBUTE
X-COORDINATE
Y-COORDINATE
Z-COORDINATE
GUARDRAIL G1
GUARDRAIL G2
ROAD SIGN L1 LEFT SIDE
ROAD SIGN L1 RIGHT SIDE
ROAD SIGN L2 LEFT SIDE
ROAD SIGN L2 RIGHT SIDE

The invention claimed is:

1. A road image analyzing apparatus, comprising:
two image pickup units that photograph the same position from different directions;
a continuous component extracting unit that extracts a linear component through analysis on an edge component extracted from image data obtained by one of the image pickup units, extracts a columnar structure, a road marking, and a guardrail as the continuous component that are repetitively present in a predetermined direction or continuous in the predetermined direction in an image on the basis of a position and an inclination of the linear component and association between linear lines including data on a width of a road marker and a width between road markers, and excludes the columnar structure from the continuous component, on the basis of the inclination or the position on a road of the linear component;
a three-dimensional position calculating unit that combines an end point of the continuous component with the columnar structure excluded and image data obtained by the other image pickup unit to calculate three-dimensional position information of the continuous component; and
an identifying unit that determines whether the continuous component is a road marking or a guardrail on the basis of the three-dimensional position information calculated by the three-dimensional position calculating unit.

2. The road image analyzing apparatus according to claim 1, wherein
the three-dimensional position calculating unit performs a matching process between an end point of the continuous component and the image data obtained by the other image pickup unit to calculate three-dimensional position information.

3. The road image analyzing apparatus according to claim 1, wherein
the identifying unit determines the continuous component on the basis of height information of the continuous component included in the three-dimensional position information.

4. The road image analyzing apparatus according to claim 1, wherein
the continuous component extracting unit, the three-dimensional position calculating unit, and the identifying unit each performs their process in a sub-area, the sub-area defined in a direction orthogonal to a running direction of a road.

5. A road image analyzing method comprising:
a step of photographing the same position from two different directions;
a step of extracting a continuous linear component from image data obtained by one of the image pickup units through analysis on an edge component extracted from image data obtained by one of the image pickup units, extracting a columnar structure, a road marking, and a guardrail as the continuous component that are repetitively present in a predetermined direction or continuous in the predetermined direction in an image on the basis of a position and an inclination of the linear component and association between linear lines including data on a width of a road marker and a width between road markers, and excluding the columnar structure from the continuous component, on the basis of the inclination or the position on a road of the linear component;
a step of combining an end point of the continuous component with the columnar structure excluded and image data obtained by the other image pickup unit and calculating three-dimensional position information of the continuous component; and
a step of determining whether the continuous component is a road marking or a guardrail on the basis of the three-dimensional position information calculated by the three-dimensional position calculating unit.

6. The road image analyzing method according to claim 2, wherein
in the step of calculating three-dimensional position information of the continuous component, a matching process is performed between an end point of the continuous component and the image data photographed from the other direction to calculate three-dimensional position information.

7. The road image analyzing method according to claim 5, wherein in the step of identifying a continuous component, the continuous component is determined on the basis of height information of the continuous component included in the three-dimensional position information.

8. The road image analyzing method according to claim 5, wherein the step of extracting a continuous component, the step of calculating three-dimensional position information of a continuous component, and the step of determining a continuous component are each performed in a sub-area, the sub-area defined in a direction orthogonal to a running direction of a road.

* * * * *